Dec. 28, 1965 E. V. BONNER, JR 3,225,987
SKI AND POLE CARRIER
Filed July 3, 1964 3 Sheets-Sheet 1

INVENTOR:
EUGENE V. BONNER JR.
BY Howson & Howson
ATTYS.

Dec. 28, 1965    E. V. BONNER, JR    3,225,987
SKI AND POLE CARRIER
Filed July 3, 1964    3 Sheets-Sheet 2
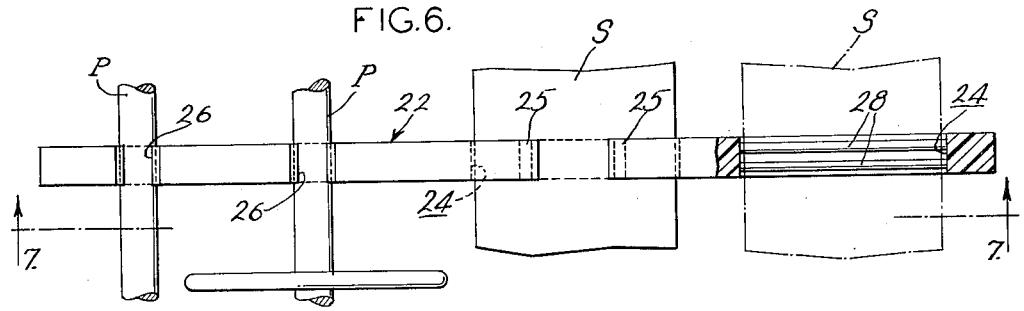
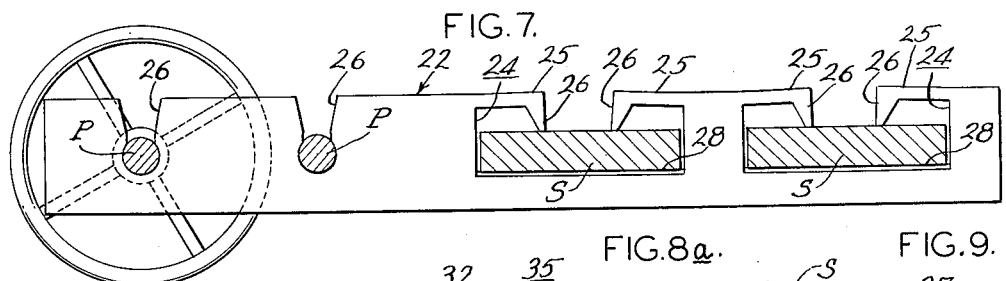
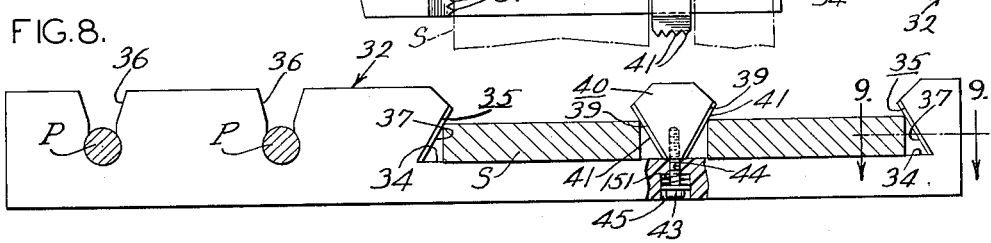
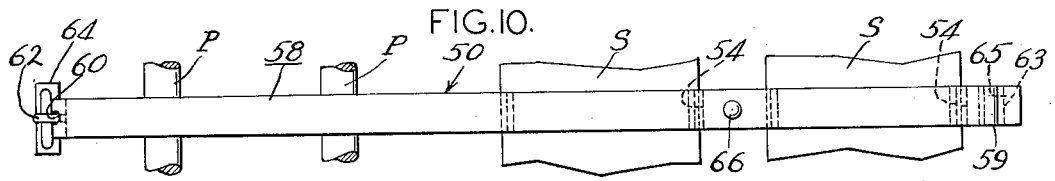
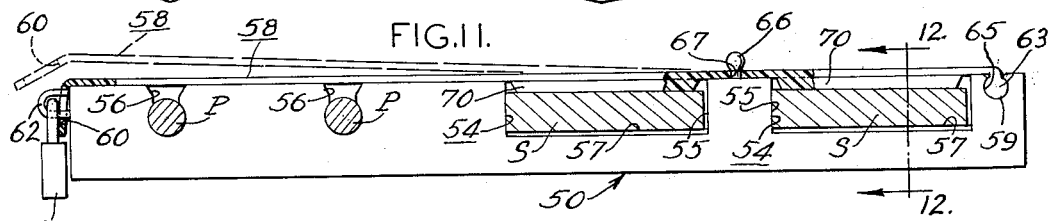
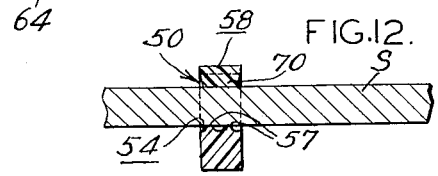
INVENTOR:
EUGENE V. BONNER, JR.
BY Howson & Howson
ATTYS.

Dec. 28, 1965  E. V. BONNER, JR  3,225,987
SKI AND POLE CARRIER
Filed July 3, 1964  3 Sheets-Sheet 3

INVENTOR:
EUGENE V. BONNER, JR.
BY Howson & Howson
ATTYS.

United States Patent Office 3,225,987
Patented Dec. 28, 1965

3,225,987
SKI AND POLE CARRIER
Eugene V. Bonner, Jr., Maple Glen, Pa., assignor to Sole Manufacturing Co., Inc., Maple Glen, Pa., a corporation of Pennsylvania
Filed July 3, 1964, Ser. No. 380,183
10 Claims. (Cl. 224—45)

The present invention relates to improvements in carriers for carrying skis and poles.

Skis and poles are conventionally transported from one location to another on various types of commercially available ski racks which may be mounted on the roof of an automobile. An example of one type used on automobiles is known as a scissors rack and comprises a pair of stationary, spaced apart beams extending transversely of a car top and an arm pivoted at one end of each of the beams and adapted to be secured at the opposite end by means of a latch. With the arm in an open position, the skis and poles are placed side by side on the stationary beam and then the arm is closed over the skis and poles to hold them in place. In loading this type of rack the skis and poles are individually put in place in the rack. This type of rack solves the problem of transporting the ski equipment over long distances. However, when the skiers arrive at their ski destination such as a lodge or the like, there are instances when it is desirable for each skier to carry the skis and poles as a unit, for example, from the automobile to the lodge and from the lodge to the ski area. In order to facilitate carrying the skis and poles, in some instances skiers secure the skis and poles together in a bundle with straps. However, this make-shift arrangement is clumsy and further presents the possibility of damaging the closely bunched, interengaging skis and the poles. Moreover, when the skis and poles are bundled with straps, they cannot be placed in the conventional scissors type rack. Thus, it is readily apparent that it may be necessary to bundle and unbundle the skis several times for example, when it is desired to place them in and take them out of the rack on top of an automobile. There are some known types of ski and pole carriers. These however, are expensive and complicated and for these reasons are not in wide use. Moreover in these known carriers, the skis and poles are not supported in a manner whereby they may be mounted directly onto the ski rack of an automobile, for example, and thus the problem of bundling and unbundling the skis and poles is not obviated.

With the foregoing in mind, an object of the present invention is to provide a carrier facilitating the handling and transportation of skis and poles which overcomes the problems and disadvantages of prior known types of carriers. To this end, in accordance with the present invention the carrier comprises a pair of support frames, each of which has a pair of pockets or openings therein of a size and shape to receive a ski and snugly embrace the same and a pair of generally key-hole shaped slots extending from an edge of the support frame within which the poles may be detachably mounted. In use, therefore, one of the support frames is slid over the tip end of the skis with one ski in each pocket and another support frame is slid over the heel end of the skis. Thereafter the poles are snapped between the aligned key-hole slots in each of the support frames. The support frames are moved toward the central harness mounting area of skis whereby due to the gradually increasing thickness of the skis, the skis become snugly engaged in the pockets. The pockets or openings may be arranged side by side so that when the skis are assembled therein, the skis and poles are supported in a parallel side by side relation whereby they may be readily placed as a unit in a conventional ski rack on the top of an automobile.

With the carrier of the present invention the skis and poles may be readily transported from place to place. Further it is noted that the skis and poles are sparated from each other, thus preventing the possibility of damage due to rubbing together as was previously the case in the make-shift strap ties. Moreover, the carrier of the present invention may be employed when it is desired to store the skis and poles for a long period. Additionally, the skis and poles are supported in the carrier in such a manner that the entire assembly may be readily placed on a conventional ski rack on top of an automobile without having to remove the carrier as contrasted with the tie strap arrangement where the skis and poles had to be completely disassembled and placed one at a time in the ski rack. Further with the carrier of the present invention, the assembled unit is balanced longitudinally and transversely for ease of carrying as illustrated in FIG. 13.

With the foregoing in mind, an object of the present invention is to provide a carrier for skis and poles which is of comparatively simplified construction, is easy and economical to manufacture and completely effective in operation and use for its intended purposes.

Another object of the present invention is to provide a carrier for skis and poles which may be assembled readily and quickly to the skis and poles and wherein portability of the skis and poles as an integral unit is greatly facilitated.

A further object of the pesent invention is to provide a carrier for skis and poles wherein the skis and poles are firmly supported in place in spaced relation thereby to minimize damage to the skis and poles as a result of contact with one another.

A still further object of the present invention is to provide a carrier for skis and poles which may be used to support skis and poles as a unit when it is desired to store the skis for an extended period of time.

These and other objects of the present invention and the various features and details of the operation, construction and use thereof are hereinafter more fully set forth with reference to the accompanying drawings, wherein:

FIG. 1 is a fragmentary plan view of the top of an automobile and a conventional ski rack wherein the skis and poles are supported in a carrier constructed in accordance with the present invention;

FIGS. 2 and 3 are enlarged sectional views taken on lines 2—2 and 3—3 of FIG. 1;

FIG. 6 is a plan view partially in section of a second embodiment of ski and pole carrier in accordance with the present invention;

FIG. 7 is a view taken on lines 7—7 of FIG. 6;

FIG. 8 is a side elevational view of a third embodiment of carrier for skis and poles in accordance with the present invention;

FIG. 8a is a plan view showing the separating knob for the carrier turned 90° relative to the position shown in FIG. 8;

FIG. 9 is a fragmentary sectional view taken on lines 9—9 of FIG. 8;

FIG. 10 is a plan view of a fourth embodiment for carrier for skis and poles constructed in accordance with the present invention;

FIG. 11 is a side elevational view of the ski and pole carrier shown in FIG. 10;

FIG. 12 is an enlarged fragmentary sectional view taken on lines 12—12 of FIG. 11;

Figure 4:
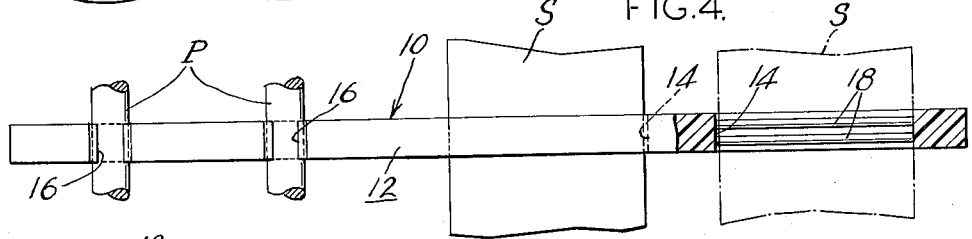
FIG. 4 is an enlarged sectional view taken on line 4—4 of FIG. 3.
Figure 5:
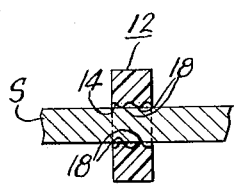
FIG. 5 is an enlarged fragmentary sectional view taken on lines 5—5 of FIG. 3.

Referring now to the drawings and particularly to FIGS. 1–5 thereof, there is shown a first embodiment of carrier 10 for skis S and poles P constructed in accordance with the present invention. As illustrated, the carrier comprises a pair of support frame members 12 of identical configuration. Each support frame member 12 is of generally rectangular shape and has a pair of recesses 14 therein defining pockets for the skis which in the present instance are of rectangular shape and are disposed in side by side relation. Each of the recesses 14 as best illustrated in FIGS. 4 and 5 has a plurality of ribs 18 along its confronting longitudinal sides adapted to frictionally engage the top and running surface of the skis when the skis are mounted therein. The support frame member 12 also has means for supporting poles P, in the present instance, a pair of key-hole slots 16 positioned next to the recesses 14 and extending from the top edge of the support frame. The carrier 10 is preferably made of a rigid, resilient material which remains somewhat pliable even at extremely low temperatures. Various types of plastics and rubbers either natural or synthetic have been found to be suitable materials. Of course, it is to be understood that the carrier 10 may also be made of metal and the recesses 14 and key hole slots 16 may be lined with a resilient material. Further, if desired, the carrier may be manufactured by conventional molding process and requires no assembly or finishing so that it may be mass produced economically.

When it is desired to pack the skis S and poles P, the skis S may be positioned in side by side position on a supporting surface such as a table or floor. Thereafter, the tips T of the skis S are placed in the recesses 14 of one of the support frames 12 and then the support frame is slid to the position shown in FIG. 1 adjacent the harness mounting area H of the skis S. In this position, the skis S are snugly engaged by the ribs 18. The other support frame 12 is then placed over the heel R of the skis S and slid to the position adjacent the harness mounting area H indicated in FIG. 1. Thereafter, the poles P are inserted between the key-hole slots 16 in each of the support frames 12, the poles P preferably being reversed so that the handle of one pole faces the tip end of the skis and the handle of the other pole P faces the heel end of the skis.

Figure 1:
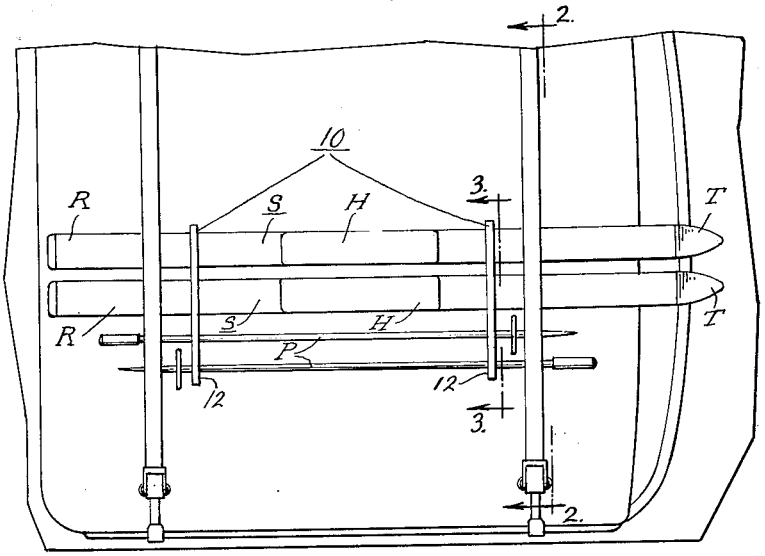
Figure 2:
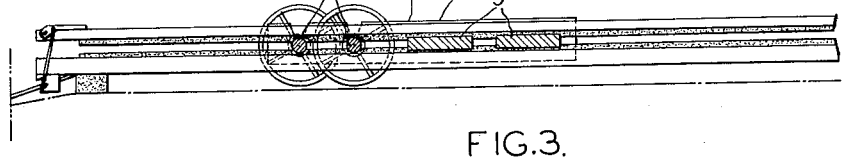
Figure 3:
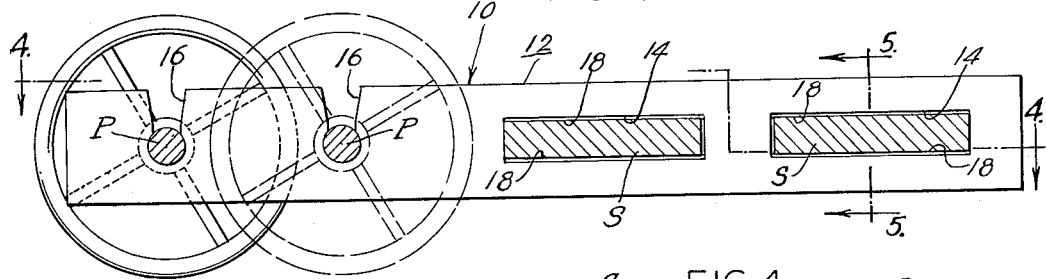
Figure 13:
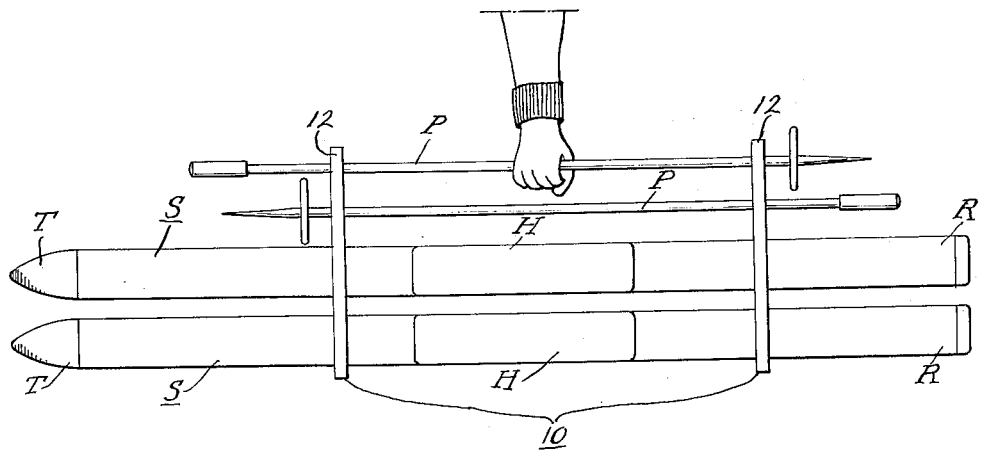
FIG. 13 is a side elevational view showing a carrier constructed in accordance with the present invention with skis and poles mounted therein.

By this arrangement, there is provided a compact unit which is readily portable by a user by merely gripping one of the poles which serves as a handle as indicated in FIG. 13. The entire unit is balanced both transversely and longitudinally for ease of handling. The carrier 10 supports the skis S and poles P in close side by side relation in a manner whereby the entire unit may be placed in a conventional ski rack of the type illustrated in FIG. 1. Thus, the user may place the skis and poles in the carrier before starting a trip, places the entire unit in a conventional ski rack for an automobile as illustrated in FIG. 1, and then when he arrives at his destination, merely removes the entire unit from the ski rack. As a unit, the skis and poles are conveniently transportable at the ski area until ready for use. Now, when it is desired to use the skis and poles, the poles P may be readily removed from the carrier simply by snapping the poles out of the key-hole slots 16 and then the support frames 12 may be slid over the tips and heels of the skis to free the skis for use.

There is shown in FIGS. 6 and 7, a second embodiment of ski and pole carrier in accordance with the present invention. Similar to the first embodiment, the carrier comprises a pair of support frames 22 of identical construction, only one of which is shown in the drawings. Each of the support frames 22 which may be made of a rigid, resilient material such as plastic or hard rubber, has a pair of side by side pockets 24 for supporting the skis in parallel side by side relation and a pair of key-hole slots 26 for the poles to one side of the pockets 24. In this embodiment, the top of each pocket 24 is defined by a pair of confronting arms 25 spaced apart at their tip ends, each arm 25 having a depending tab or tongue 26 which is adapted to frictionally engage the top surface of the ski as illustrated in FIG. 7. The bottom wall of each pocket 24 has a pair of ribs 28 whereby the ski is firmly embraced between the tongues 26 and the ribs 28 in the assembled relation.

These support frames 20 are assembled to the skis S and poles P in much the same manner as the carrier of the previously described embodiment. Thus the skis may be laid in close side by side relation on a supporting surface and thereafter the tips and heels of the skis are engaged in the pockets of the support frames. The support frames 22 are then moved toward the harness area of the skis S whereby due to the contour of the skis are firmly engaged between the tabs 26 and ribs 28. Thereafter the poles P are snapped in place between the key-hole slots 26.

FIGS. 8, 8a and 9 illustrfate a third embodiment of ski and pole carrier in accordance with the present invention. In this embodiment, the carrier comprises a pair of support frame members 32, only one of which is illustrated in the drawings. The support frame member 32 includes a pair of spaced apart key-hole slots 36 at one end thereof for the poles P and a pair of pockets 34 within which the skis are adapted to be mounted. In the present instance, however, the support frame has an enlarged cutout defining the pockets and the outer sides of the pockets are characterized by cut-back, slanted side edge portions 35 which are provided with a series of ribs 37 to provide a resilient surface against which the outer side edges of the skis S abut. The pockets 34 are separated by a knob-like divider 40 having slanted side edges 39 which converge downwardly and which are provided with ribs 41.

This knob-like divider 40 is rotatably secured to the support frame by a screw 43 engaging through an opening 44 in the support frame, the opening being enlarged as at 45 to accommodate a spring 151 normally biasing the divider 40 against the base defining the bottom of the pockets as illustrated. This construction permits the knob member to be turned to a position illustrated in FIG. 8a, permitting insertion of skis into the pockets.

Thus, in assembling the skis and poles to the support frames, the knob-like divider 40 is turned to the position shown in FIG. 8a whereby the skis may be readily placed in the pockets 34. Now, with the support frames in the proper position on opposite sides of the harness engaging area of the skis S, the dividers 40 are turned approximately 90° to the position shown in FIG. 8 thereby to secure the skis in place. The poles P are then snapped into the key-hole slots 36 as in the previously described embodiments.

There is shown in FIGS. 10 and 11 another embodiment of ski and pole carrier in accordance with the present invention. The carrier comprises a pair of support frames 50 only one of which is shown in the drawings. The support frame 50 as illustrated has a pair of pockets 54 disposed in side by side relation to support the skis S in parallel side by side relation and a pair of key-hole slots 56 adjacent the pockets 54 to support the poles P in parallel side by side relation next to the skis.

In the present instance the pockets 54 are defined by cutouts 55 extending from the top edge of the support frame 50, the bottom of the pocket having a plurality of ribs 57 which engage the running surface of the ski S in the assembled relation. In the present instance, the support frame 50 includes an elongated flexible strap 58 which is secured to the top of the support frame adjacent one end as at 59 and which has a slotted opening 60 at its opposite terminal end. The opening 60 engages over a U-shaped latch 62 in the end wall of the support member for application of a lock 64 thereby to secure the strap 58 over the pockets 54 and key-hole slots 56 and prevent removal of the skis and poles from the carrier. In the present instance, the strap 58 has a bulb 63 at one end which engages in a spherical opening 65 in the support frame, both the strap 58 and the support frame 50 adapted to be made of a resilient material such as plastic or hard rubber. The strap 58 is maintained in close contact with the top edge of the support frame by means of a button 66 projecting from the land between the pockets which angages in an opening 67 in the strap. The strap is also provided with a pair of depending portions 70 which in the assembled relation bear against the top surface of the ski as illustrated in FIGS. 11 and 12.

Considering now use of the carrier, a pair of support frames 50 may be positioned on a supporting surface at predetermined spaced apart locations in approximate parallel relationship. Thereafter, with the strap 50 folded back, the skis are placed in the pockets 54 with the support frames disposed on either side of the harness engaging area of the ski S. Thereafter the poles P are snapped into the aligned key-hole slots 56. The strap 58 of each support frame 50 is then positioned over the top of the support carrier. The free end of the strap 58 is engaged over the U-shaped latch 62 so that the lock 64 may be applied thereto. Thus, in this position the depending portions 70 engage the top surface of the skis S and the skis and poles are secured against removal from the carrier. Further, in the assembled relation the carrier possesses all of the advantages noted above. The skis and poles are firmly supported in place as an integral unit, which unit is adapted to be transported easily and conveniently by the user. The unit is balanced both longitudinally and transversely so that the skis and poles are not cumbersome to transport about.

Figure 14:
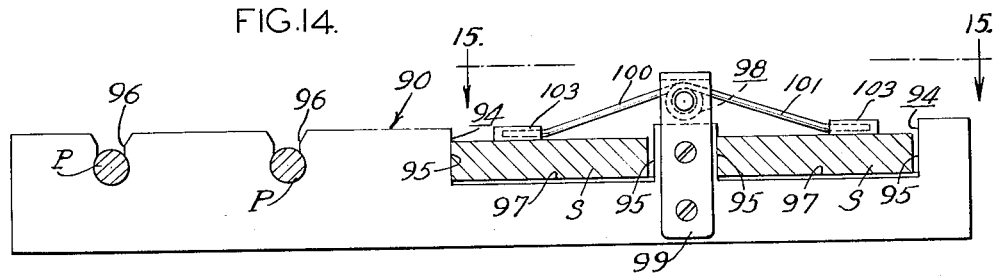
FIG. 14 is a side elevational view of a fifth embodiment of carrier for skis and poles in accordance with the present invention.
Figure 15:
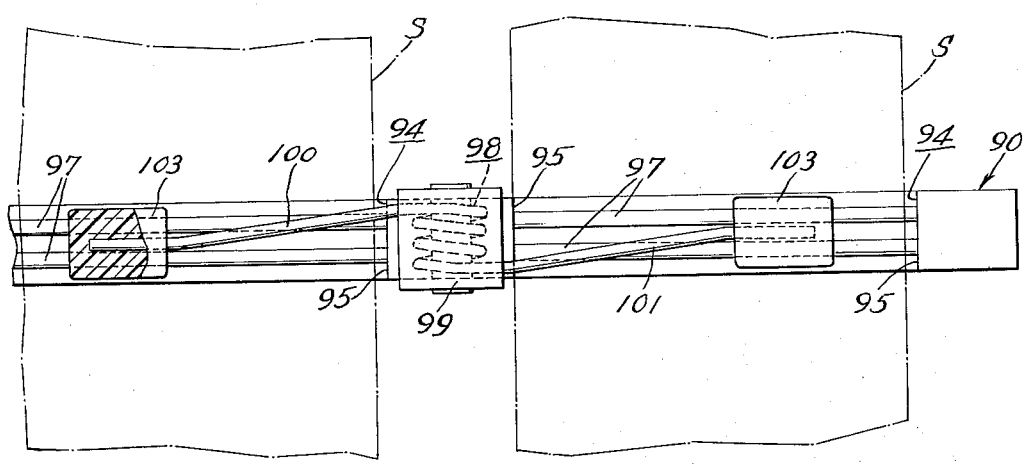
FIG. 15 is an enlarged sectional view taken on lines 15—15 of FIG. 14.

There is shown in FIGS. 14 and 15 a fifth embodiment of ski and pole carrier in accordance with the present invention. The carrier comprises a pair of support frames 90, only one of which is shown in the drawings. The support frame 90 has a pair of spaced apart side by side pockets 94 defined in the present instance by a pair of cutouts 95 extending from the top edge of the support frame 90. The support frame 90 also has a pair of key-hole slots 96 adjacent the pockets 94 for the poles P. The bottom edge of each of the pockets 94 has a plurality of ribs 97 which have some resilience and which engage the running surface of the skis as illustrated in the drawings. In the present instance, the skis S are firmly supported in the pockets by means including a coil spring 98 supported centrally of the pockets in an inverted C-shaped bracket 88, the coil spring having a pair of arms 100 and 101 which mount at their free terminal ends pads 103 which engage against the top surface of the skis S.

In using the carrier described above, the skis may be positioned in the pockets by lifting the arms 100 and 101 upwardly away from the pockets and thereafter when the skis are in place in the pockets, the arms 100 and 101 are released whereby the pads 103 press the skis firmly against the resilient ribs 97. Thereafter the poles P may be inserted between the aligned key-hole slots 96 in the pair of support frames. Thus it is apparent that this embodiment of carrier is also of a relatively simplified construction, is easily applied to the skis and poles and the assembled unit is readily transportable being balanced both longitudinally and transversely.

While particular embodiments of the present invention have been illustrated and described herein, it is not intended to limit the invention and changes and modifications may be made therein within the scope of the following claims.

I claim:

1. A carrier for skis and poles comprising a pair of support frame members, means defining at least one pair of pockets in each of said support frame members for supporting the skis therein in side by side relation, at least one pair of key-hole slots in each of said support frame members wherein the poles are adapted to be detachably mounted.

2. A carrier for skis and poles including at least one support frame, means defining at least one pair of pockets disposed in side by side relation in said support frame within which the skis engage and means in said suppor frame for detachably supporting the poles therein, said pole support means and pockets being spaced apart and disposed relative to one another to support the skis and poles in a common plane.

3. A carrier as claimed in claim 2 wherein the pockets are in the form of rectangular shaped recesses in side by side relation in said frame and including ribs projecting from the top and bottom sides of each of said recesses adapted to frictionally engage the skis when inserted therein.

4. A carrier as claimed in claim 2 wherein the support frame is made of a rigid, resilient material.

5. A carrier as claimed in claim 2 wherein the top of each pocket is defined by a pair of confronting arms spaced apart at their tip ends, each arm having a depending tab at its terminal end adapted to frictionally engage the skis when inserted therein.

6. A carrier as claimed in claim 2 wherein the support frame is provided with an enlarged cutout and a divider is mounted centrally of the cutout to separate the same and define the side by side pockets.

7. A carrier as claimed in claim 6 wherein the outer sides of each of the pockets has slanted side edge portions with a plurality or ribs therein adapted to frictionally engage side edge portions of the skis and wherein the divider is pivotally mounted to the support frame and has slanted side edge portions with ribs adapted in one position to engage side edge portions of the skis.

8. A carrier for skis and poles including at least one support frame, means defining a pair of generally rectangular, spaced apart cutouts extending from one edge of said support frame defining a pair of pockets for skis, means defining at least one pair of key-hole slots depending from said one edge of said support frame adapted to detchably support the poles therein, said slots and pockets being spaced apart and disposed relative to one another to support said skis and poles in a common plane, and a strap at one end of said support frame adapted in one position to overlie the top edge of said support frame and means for detachably securing the outer end of said strap to the end of said support frame opposite said one end thereby to lock said skis and poles in place.

9. A carrier as claimed in claim 8 including a button mounted on said one edge of said support frame and means defining an opening in said strap adapted to engage over said button to retain said strap in said one position.

10. A carrier as claimed in claim 9 wherein said strap includes a pair of depending portions aligned with the pockets adapted to bear again one surface of the skis when the strap is in said one position.

References Cited by the Examiner

UNITED STATES PATENTS 2,336,422  12/1943  Ratcliff.

FOREIGN PATENTS 559,144  6/1958  Canada.
614,238  12/1960  Italy.
380,557  9/1964  Switzerland.
304,925  4/1955  Switzerland.

HUGO O. SCHULZ, *Primary Examiner.*